United States Patent [19]
Eshel

[11] 4,170,389
[45] Oct. 9, 1979

[54] FOIL BEARING

[75] Inventor: Abraham Eshel, Los Altos, Calif.

[73] Assignee: Ampex Corporation, Redwood City, Calif.

[21] Appl. No.: 835,275

[22] Filed: Sep. 21, 1977

[51] Int. Cl.² ............................................ F16C 17/08
[52] U.S. Cl. ...................................... 308/160; 308/9
[58] Field of Search .................... 308/9, DIG. 1, 122, 308/135, 160, 163, 172; 267/122, 118, 113, 65 A

[56] References Cited

U.S. PATENT DOCUMENTS

| | | | |
|---|---|---|---|
| 1,425,979 | 8/1922 | Kingsbury | 308/160 |
| 2,711,315 | 6/1955 | Mosebach | 267/65 A |
| 2,756,016 | 7/1956 | Painter | 267/118 |
| 3,174,809 | 3/1965 | Mackie | 308/9 |
| 3,298,751 | 1/1967 | Elwell | 308/9 |
| 3,627,297 | 12/1971 | Gaydecki | 267/118 |
| 3,806,209 | 4/1974 | Laing et al. | 308/9 |
| 3,870,382 | 3/1975 | Reinhoudt | 308/9 |
| 3,971,602 | 7/1976 | Anderson | 308/160 |

*Primary Examiner*—Charles E. Frankfort

[57] ABSTRACT

A foil member is stretched over a body of pressurizing material so as to be caused to balloon outwardly toward a rotating shaft. A fluid (e.g., air) film bearing is formed between the foil and shaft. The pressurizing material for the foil may be incompressible, but capable of plastic flow (e.g., water). Consequently, the foil is substantially stiff and unyielding to movement of the shaft toward the foil, but is locally yielding as to particles of foreign material that may get into the air film zone between foil and shaft or to misalignment of the shaft, and elastically recovers its original shape when the particle is gone, or the misalignment is corrected, having meanwhile suffered no damage.

30 Claims, 19 Drawing Figures

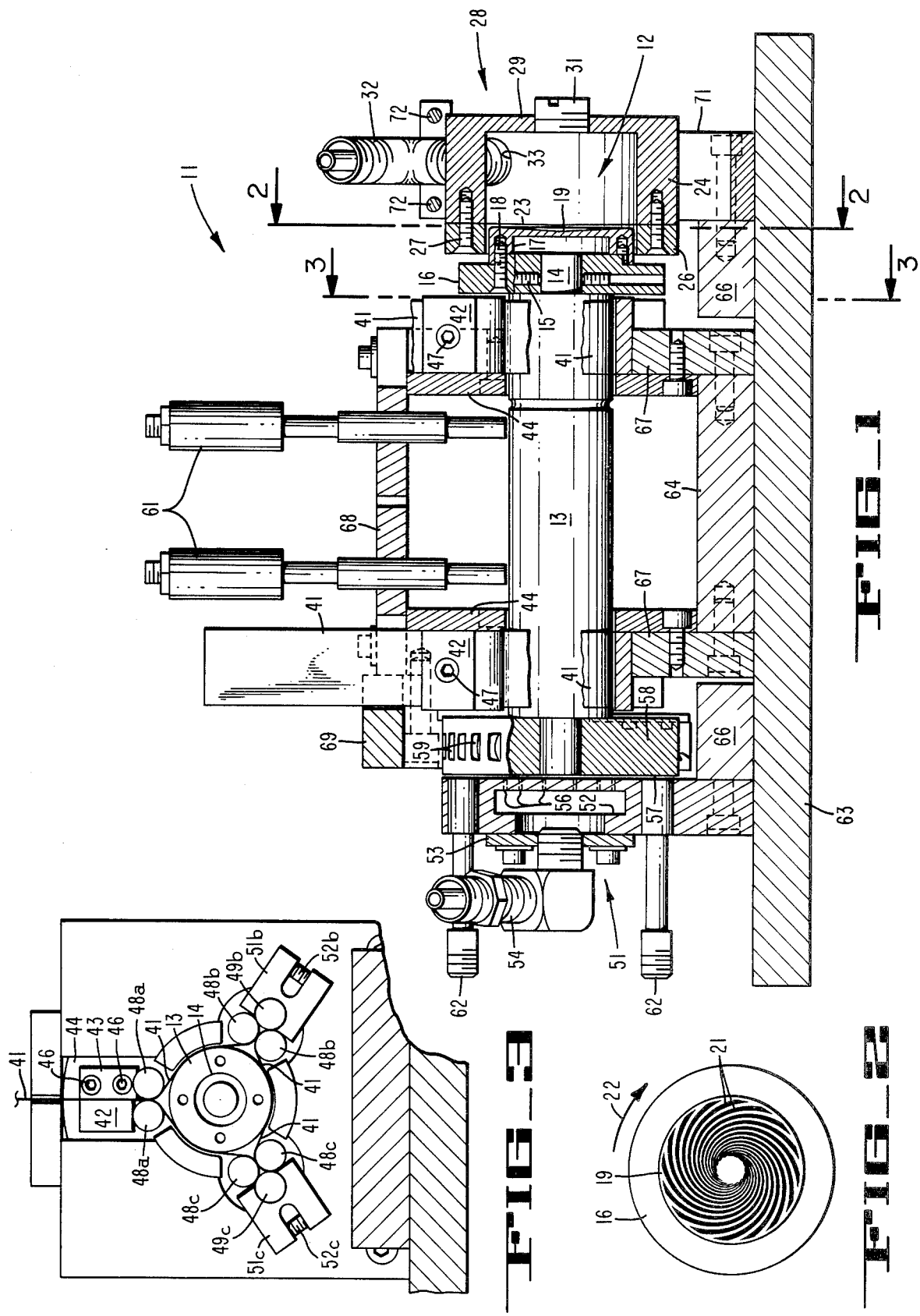

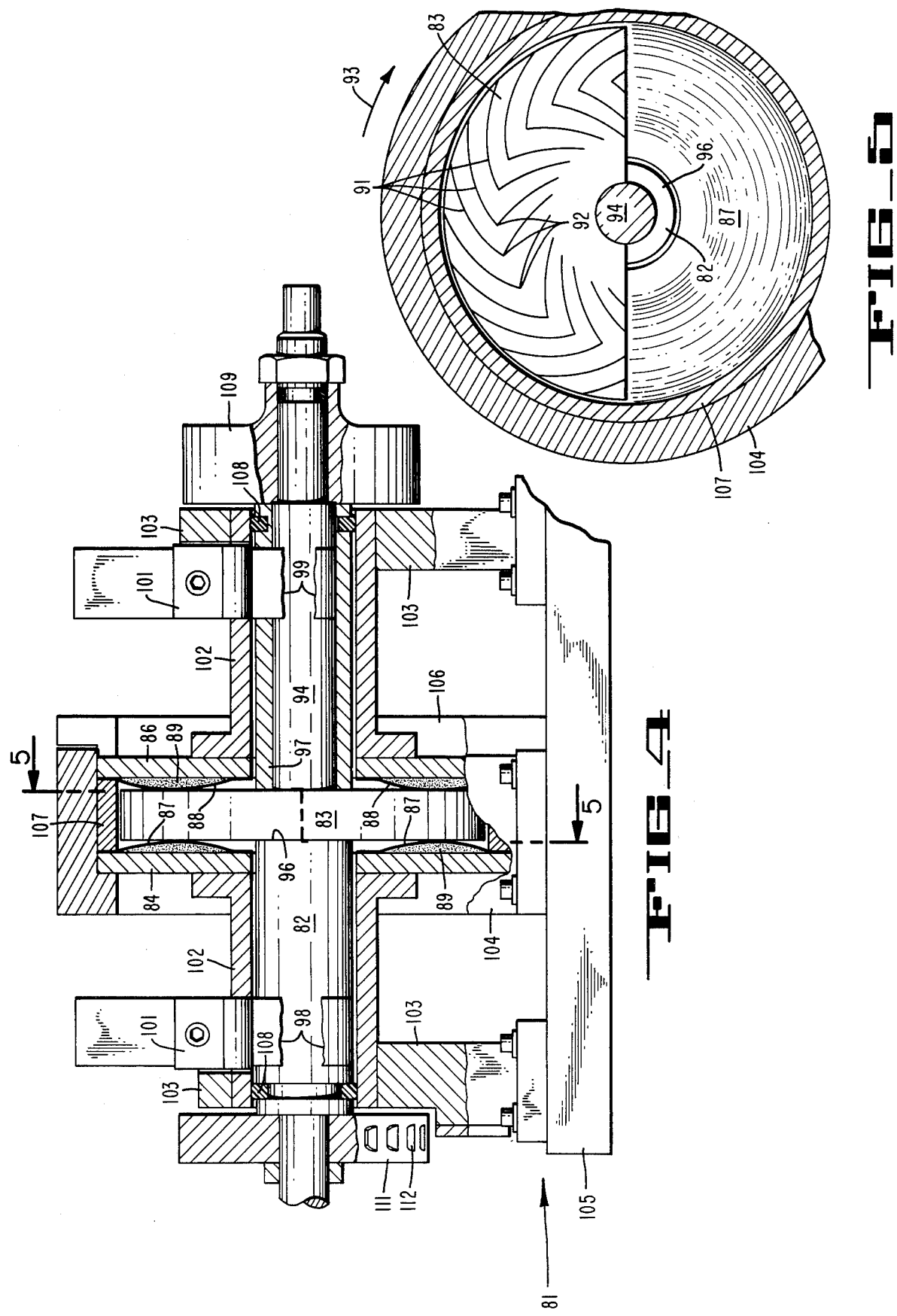

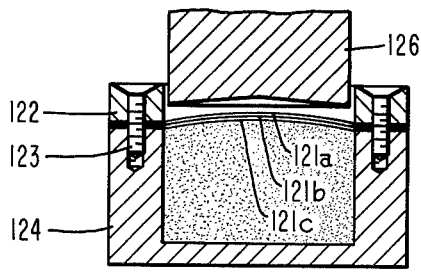
FIG_6A
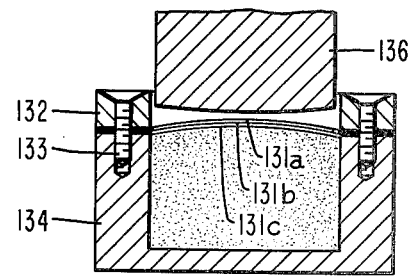
FIG_6B
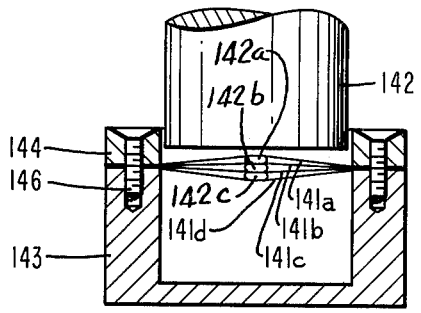
FIG_7
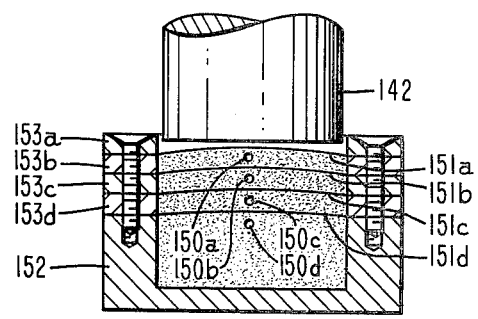
FIG_8
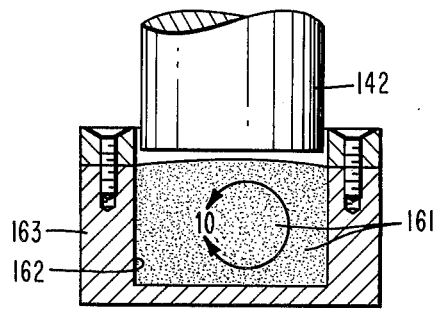
FIG_9
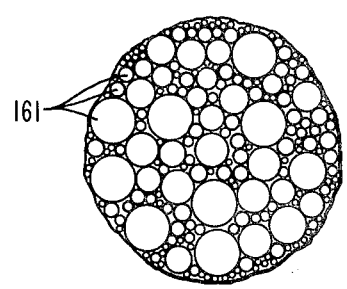
FIG_10
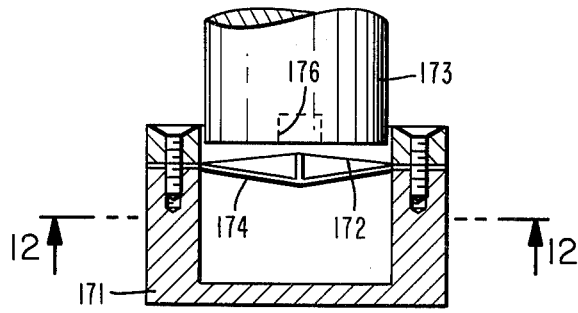
FIG_11
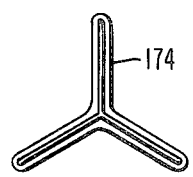
FIG_12

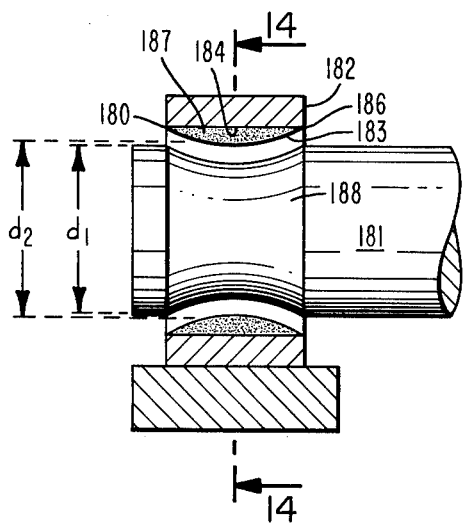
FIG_13
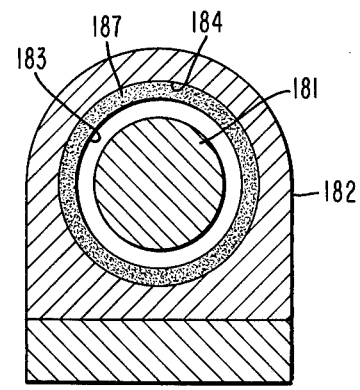
FIG_14
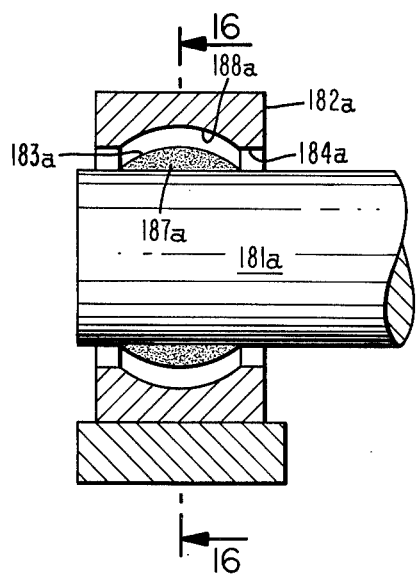
FIG_15
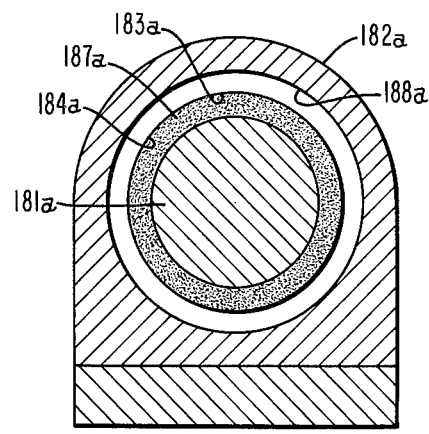
FIG_16
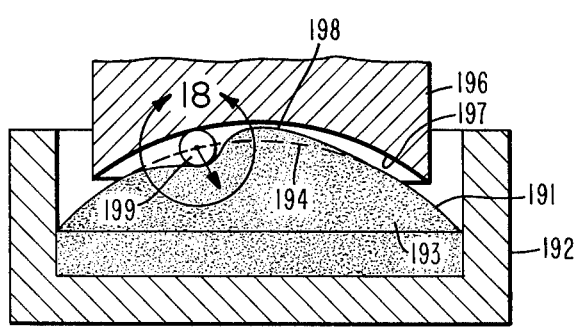
FIG_17
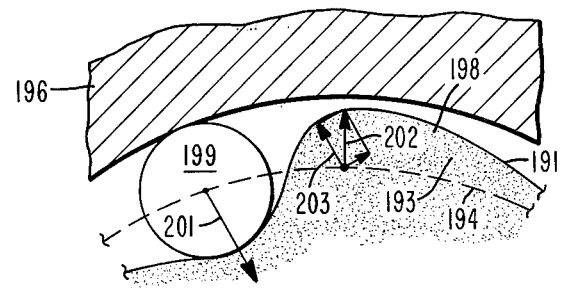
FIG_18

FOIL BEARING

BACKGROUND OF THE INVENTION

This invention relates to thrust and journal bearings for rotating shafts, and particularly to foil bearings for supporting such shafts on self-acting or externally pressurized air bearing films.

Hard (e.g., solid metal) thrust and journal bearings for rotating shafts are known in the art, and have been adapted for the production of self-acting or externally pressurized air bearing films. However, such hard bearings are apt to suffer great damage, or even to be destroyed, if a particle of foreign matter, particularly very hard matter, gets into the air bearing film zone.

Foil journal bearings of the sling type, i.e., wrapped at least part way around the shaft, have also been used with self-acting air bearing films, and are well adapted to tolerate foreign particles without damage, but are conversely inclined to be somewhat more yielding to bodily displacement of the shaft itself than is desirable in some applications, for example, applications in which the precise maintenance of a certain axial position is required for the rotating shaft.

SUMMARY OF THE INVENTION

The present invention employs a foil which is pressurized or formed and supported so as to balloon convexly toward the rotating shaft, instead of concavely as in the prior art. The pressurizing or supporting material can be incompressible, e.g., water, so as to be locally displaceable to the intrusion of foreign particles, but relatively stiff and unyielding to movements of the entire shaft.

Accordingly, it is an object of this invention to provide a bearing for rotating shaft or other moving object, that is solid and stiff to movements of the object, but yielding and forgiving to intrusions of damaging foreign particles.

DESCRIPTION OF THE DRAWINGS

FIG. 1 is an elevation view, partly in section, of an apparatus incorporating the invention.

FIG. 2 is an end view of a portion of the apparatus taken on the plane of lines 2—2 of FIG. 1.

FIG. 3 is a cross section taken on the plane of lines 3—3 of FIG. 1.

FIG. 4 is an elevational view, partly in section, of another apparatus incorporating the invention.

FIG. 5 is a cross section taken on the planes of lines 5—5 of FIG. 4.

FIG. 6A is a cross section elevation of a variational form of the invention.

FIG. 6B is a cross section elevation of a variational form of the invention.

FIG. 7 is a cross section elevation of a variational form of the invention.

FIG. 8 is a cross section elevation of a variational form of the invention.

FIG. 9 is a cross section elevation of a variational form of the invention.

FIG. 10 is an enlarged view of the zone 10—10 of FIG. 9.

FIG. 11 is a cross section elevation of a variational form of the invention.

FIG. 12 is a plan view of a portion of the apparatus taken on lines 12—12 of FIG. 11.

FIG. 13 is a cross section elevation of a variational form of the invention.

FIG. 14 is a cross section taken on the plane of lines 14—14 of FIG. 13.

FIG. 15 is a cross section elevation of a variational form of the invention.

FIG. 16 is a cross section taken on the plane of lines 16—16 of FIG. 15.

FIG. 17 is a cross section illustrating the operation of the invention; and

FIG. 18 is an enlarged view of zone 18—18 of FIG. 17.

DESCRIPTION OF THE PREFERRED EMBODIMENT

Referring now to FIG. 1 of the drawings, there is shown an apparatus 11 incorporating the present invention as part of a thrust bearing 12 for a rotating shaft 13. The shaft has a small diameter extension 14 upon the end of which is secured, as by set screws 15, a disc-like mounting element 16, upon which in turn is mounted the thrust bearing element 17, secured as by screws 18. The thrust bearing element 17 has an axially facing end bearing face 19 that is of hollow conical form and that is provided with spiral pumping grooves 21 (FIG. 2), of a type known previously in the art, for the purpose of generating a self-acting air-bearing film when the shaft rotates in a clockwise direction, as shown in FIG. 2, and as illustrated by arrow 22 therein.

Usually in the art, a spiral-grooved pumping thrust bearing face such as face 19 is axially confronted by a solidly based non-rotating bearing element, which aids in the creation of the self-acting air bearing film in the small clearance space between the non-rotating bearing element and the face.

In the present invention, however, the confronting bearing element is defined by a thin foil 23, made for example of steel, which is clamped at the periphery between a cylindrical wall 24 that is coaxially aligned with the shaft 13, and a clamping ring 26 that is attached to the wall 24 as by bolts 27 passing through both ring 26 and foil 23 into wall 24. The wall 24 forms the side wall portion of a hollow cylindrical pressure chamber 28, of which the end walls are formed by the foil 23 and an end wall 29, which contains an access plug screw 31. The chamber 28 is filled with a pressurizing substance as by means of a conduit 32 coupled to the chamber through a port 33 in the sidewall 24.

The pressurizing substance, which may be any suitable fluid or particulate material, causes the foil 23 to be firmly supported against the axial thrust bearing load of the shaft 13 so as to be able to withstand this load, and to remain relatively solid and "stiff" to stop movements of the entire shaft toward the foil, but at the same time to be locally flexible and "forgiving" so as to absorb without damage the intrusion of foreign matter such as grit, dirt, dust, etc., between the shaft and foil or to accommodate shaft misalignment. In this illustrated structure, water was used as the pressurizing material. Water is relatively incompressible, but is capable of ready fluid movement laterally (as shown in FIGS. 17, 18) so as to be locally displaceable at any point where the bearing pressure becomes greater than it may be in surrounding areas. Such lateral displacement of the water then causes the foil to stretch to a greater surface area and later to rebound elastically so as to return itself and the water filling to their original shape. In this way, damage in both rotating and stationary parts of the bearing is avoided.

A more complete understanding of the previously known portions of the illustrated apparatus will be obtained from the following description. The shaft 13 is radially supported in foil journal bearings, such as those disclosed in U.S. Pat. Nos. 3,506,314 by Gross et al, and 3,520,576 to Lazar Licht. In the present apparatus, these journal bearings include two ribbon-shaped thin steel foil members 41, which are mounted as best shown in FIG. 3, in a generally triangular pattern enclosing the entire periphery of the shaft 13. The two end portions of each foil 41 are clamped between two blocks 42, 43; block 43 being attached to a vertical mounting plate 44 as by means of bolts 46, and block 42 being attached to block 43 as by means of a clamping bolt 47 which passes through holes (not shown) in the foil end portions, the passage holes being somewhat oversize so as to allow for some play of the foil in the direction of its length during the initial tensioning process, described in more detail below. The body portion of each ribbon-like foil 41 is threaded between two bearing pins 48a at the same angular position as the clamp 42, 43, thence into a tangential bend around the shaft 13 and between a second pair of bearing pins 48b and in a loop around an anchor pin 49b, to which the foil is affixed as by means of a clamp element 51b, tightened as by means of a spreading bolt 52b threaded into two arms of a Y-portion of the clamp element. A similar array of bearing pins 48c, anchor pin 49c, clamp element 51c, and spreading bolt 52c, is positioned at the third apex of the triangle, angularly equispaced (at 120 degrees) from both pins 48a and 48b. During initial assembly and tensioning of the foils 41, the clamps 42, 43, 51b and 51c are loosened, and weights are applied to the ends of foils 41, with the shaft 13 in place. When the desired tension is achieved, the clamping bolts 47, 52b and 52c are tightened and the weights are removed. During operation, the rotating shaft 13 generates a self-pressurized air bearing film between shaft and foil at the three zones of tangency of foil and shaft, all substantially as described in the above-referenced U.S. Pat. Nos. 3,506,314 and 3,520,576.

To complete the bearing structure, the end of the shaft 13, remote from the thrust bearing 12 of the present invention, may be supported in a similar thrust bearing, but is here shown as supported for test purposes in a thrust bearing 51 of the conventional externally-pressurized air bearing type, comprising a pressure chamber 52 closed by a cover 53, and pressurized with compressed air through a supply conduit 54 coupled to a source (not shown) of pressurized air. The chamber 51 has a number of axially directed orifices 56 opening toward an end face 57 of a turbine rotor element 58 attached to shaft 13. During test operation, the thrust load of the shaft on pillow bearing 12 may be varied by altering the gauge pressure of the air applied to chamber 52.

The motive power for rotating the shaft 13 comes from a pressurized air jet means (not here shown) which directs one or more jets of pressurized air in conventional fashion tangentially against peripheral bucket recesses 59 in turbine rotor 58, driving the shaft in the direction of arrow 22 (FIG. 2).

For test purposes, the bearing rig is arranged to mount conventional capacitance probes 61 and pneumatic pressure transducers 62, which are used to monitor, respectively, the radial positions of two axially spaced portions of shaft 13, and the axial positions of two diametrically spaced portions of turbine rotor 58.

The mounting structure also comprises a base plate 63, blocks 64, 66 attached thereto, vertical framing blocks 67, a horizontal upper frame element 68, and an air jet support and manifold block 69 attached to a block 67. The plates 44 are also secured to blocks 67. The pressure chamber 28 is supported in a split-block clamping member 71 that is attached to a block 66, and that can be tightened in peripheral clamping relation around the chamber by means of clamping bolts 72.

Referring now to FIGS. 4 and 5, a variational form of thrust bearing incorporating the present invention is shown as part of a test rig 81. In this structure, a rotating shaft 82 is provided with a disc-like thrust bearing plate 83, attached to the shaft for rotation therewith, and mounted normal to the shaft at approximately the mid-point of the shaft length; and the fixed or stationary bearing surfaces are provided on a pair of plates 84 and 86, bracketing the rotating bearing plate 83 so as to limit movement, in either axial direction, of the shaft 82 and plate 83 assembly.

In this structure, a bi-directional pillow type thrust bearing is established by a pair of steel foils 87, 88 each having a generally toroidal shape, as shown particularly for the foil 87 in FIG. 5. Each toroidal foil is secured at both inner and outer peripheries to the corresponding stationary bearing plate 84, 86, and the space between the plate 84, 86 and the unsecured portion of the corresponding foil is filled with pressurizing material 89, causing the foil to bow outwardly into close proximity with the rotating plate 83. The pressurizing material may be a fluid such as water, as in the apparatus of FIG. 1, but is here shown as solid but finely particulate material. Such particulate material is inserted at the time of manufacture, prior to attachment and sealing of the inner and outer peripheries of the toroidal foils 87, 88 to the respective stationary plates 84, 86; consequently no pressurizing ports are needed. The requirements for sealing are merely that the zone of attachment between foil and plate be sufficiently continuous to assure retention of the filling material under the stress of the working conditions to be expected. Any suitable method for securing foil to plate may be used, e.g., welding, brazing, or cementing, as with epoxy or other strongly bonding adhesives.

As with the apparatus of FIG. 1, the apparatus of FIGS. 4 and 5 may be provided with pumping grooves 91, shown in FIG. 5 as formed in the face of plate 83 confronting the plate 86 and foil 88. Similar grooves (not shown) are formed in the opposite face of plate 83, confronting plate 84 and foil 87. The grooves 91 are of a type known in the art, having a so-called "herringbone" or V-shaped pattern, oriented with the apex 92 of each "V" pointing in a direction opposite to the direction of rotation, illustrated by arrow 93 in FIG. 5. Thus, during rotation, the effect of the grooves is to scoop air from both inner and outer peripheral zones and to concentrate this air toward a mid-radius of the grooved area, causing the air to form a self-acting pressurized fluid bearing film between plate 83 and the adjacent foil. If desired, the grooved area of plate 83 may be concave facing the foil, so as to conform to the convexly bowed foil, but is here shown as of generally planar form, normal to the shaft 82 axis.

Further construction details of the rig 81 are as follows. To fit the plate 83 on the shaft 82, the shaft 82 has a reduced diameter portion 94, leaving a shoulder 96, against which the plate 83 is seated. A sleeve 97 is then fitted over the shaft portion 94 and secured in seated position against the plate 83. A pair of foil journal bearings 98 and 99, secured by main clamps 101 and by side clamps (not shown), and constructed substantially as the foil journal bearings of FIG. 1, serve to journal the extending ends of shaft 82 and its sleeve 94. The foil journal bearings 98 and 99, and the stationary thrust bearing plates 84, 86, are supported by stationary housing members 102, 103, 104, 105, 106 and 107, and a pair of flexible sealing washers 108 are fitted in conforming circumferential grooves in shaft 82 and its sleeve 94, to engage the housing portions 102. A driven wheel 109 is secured to one extending end porton of the shaft 82, and an air turbine rotor element 111 is secured to the other end end of shaft 82. A compressed air supply means, including driving jets (not shown) is provided to drive buckets 112 of the turbine rotor, as in the apparatus of FIG. 1.

Referring now to FIGS. 6–12, several alternative forms of the invention are illustrated.

In FIG. 6A, a plurality of foils 121a, 121b and 121c, are superimposed in contacting-layered relation and mounted as by clamping ring 122 and bolts 123 across the opening of a pressure chamber 124. Such an arrangement provides greater bending flexibility in the foil assembly for the same total foil assembly thickness, the flexibility increasing with the number of foil layers.

In FIG. 6A, the shaft 126 is concave confronting the foil surface to match the conversely bowed shape of the foil. However, the shaft end may be convex as well, as is shown in FIG. 6B for shaft 136, confronting foils 131a, 131b and 131c, held by clamping ring 132 and bolts 133 across the opening of pressure chamber 134. Alternatively, the shaft end can be strictly planar.

In FIG. 7, four foils 141a, 141b, 141c and 141d are superimposed with centralized spacers 142a, 142b and 142c arranged therebetween so as to hold at least the outer foil 141a in covexly bowed conformation confronting the end of shaft 142. The layered foils are stretched across the mouth of chamber 143 by means of clamping ring 144 and bolts 146. With such structure, an advantage is that the interior of chamber 143 may be filled with pressurized material or left unpressurized and empty, as desired. The end of shaft 142 may be of any desired shape as well.

In FIG. 8, four foils 151a, 151b, 151c and 151d are shown clamped across the mouth of a pressure chamber 152, each layer being separated from the others by means of spacing-clamping rings 153a, 153b, 153c and 153d. Both the interior of chamber 152 and the spaces between the foils may be filled with pressurizing material, as through ports 150a, 150b, 150c and 150d, giving the outermost foils greater convexities than the innermost. An advantage of this structure is that the pressurization of the twixt-foils spaces is easier to accomplish and indeed different pressurizing materials can be used between various of the adjacent foil pairs, giving a wider range of cushioning effects.

If particulate material is used for the stuffing substance, it may be desired to use irregularly shaped and sized particles, such as grit, which would provide a comparatively damped or slow reaction; or faster cushioning reactions may be achievable with globular or spherical shaped particles, such as miniature sapphire spheres or so-called "microballoon" type glass particles.

As shown in FIG. 9 and enlarged FIG. 10, these particles 161 may be selected to have a general predetermined range of size distribution, so as to fill the cavity 162 of the pressure chamber 163 more completely. Alternatively, the spherical particles may be of substantially equal diameters, so as to provide for more constant total solid volume, the advantage of which will be discussed more fully below.

As shown in FIGS. 11 and 12, the body of chamber 171 may be left unpressurized, or altogether omitted, and the foil member 172 may be clamped across the chamber mouth and supported in convex form confronting the end of shaft 173 as by means of a spider 174, which in turn may have substantial bending flexibility, so as to give somewhat in the same manner as the foils 141b, 141c and 141d in FIG. 7. Alternatively, the spider 174 may be substantially rigid, and in such a combination, if desired, the end of shaft 173 may be hollowed out at the center as illustrated by the dashed line 176, to avoid striking any portion of the spider.

As shown in FIGS. 13 and 14, the principle of the invention may also be applied to journal bearings, or to combination journal-and-thrust bearings. A rotating shaft 181 is supported for rotation in a journal bearing block 182, as by means of a foil member 183 mounted around the inner periphery 184 of the journal block. The foil 183 is formed into toroidal form and is secured at the edges 186 to the block 182. The interior volume defined by the foil and block is filled with pressurizing material 187 so as to cause the foil to balloon radially inwardly at its axial mid-portion. The shaft 181 may be smoothly right-circular-cylindrical, but is here shown as having a circumferential groove 188 shaped as to mate with the ballooning shape of the foil. In the illustration, both the extent of ballooning of the foil, and the clearance between the foil and groove 188, are greatly exaggerated for the sake of clarity of illustration. However, it will be seen that the maximum diameter $d_1$ of the shaft 181 can be made to be less than the smallest interior diameter $d_2$ of the foil, as illustrated, in which case the bearing is a simple journal bearing; or that conversely the diameter $d_1$ of the shaft can be made to be greater than the smallest diameter $d_2$ of the foil, in which case the bearing is a combination thrust-and-journal bearing.

FIGS. 15 and 16 illustrate a variational journal bearing arrangement, in which a bearing block 182a has a journal opening 184a for a rotating shaft 181a, which has a toroidally arranged foil 183a mounted thereon, filled with pressurizing material 187a, and confronting a circumferential conforming groove 188a, formed in the block 182a rather than in a shaft.

FIGS. 17 and 18 illustrate schematically what happens when a particle of foreign matter gets between the shaft and bearing block in, e.g., a thrust bearing environment. The foil 191 is stretched on a cup-shaped bearing block 192 and filled with pressurizing material 193, in this case incompressible material, such as water, so as to cause the foil to be tensioned and resiliently ballooned outwardly to a normal-state surface illustrated by the dashed line 194. It is well known that tensioned elastic membranes tend to assume the shape that corresponds with the minimal strain energy condition possible to them considering the forces acting on them. Under some circumstances, this minimal strain energy condition corresponds at least approximately with a "smallest surface area" condition. Thus, a sphere, for example, is the shape that represents the smallest surface area that is possible for a given volume. Consequently, the shape of foil 191 is here illustrated as being a segment of spherical surface, having exaggerated curvature for the sake of clarity of illustration. Of course, it is understood that a shape other than strictly spherical may represent the minimal strain energy condition or least approximate surface area that the foil can assume. Under any conditions, however, it may be understood that there is some unique shape and a unique corresponding minimal strain energy condition that will be sought out and assumed by a tensioned and pressurized foil. The same result obtains if the foil is pre-shaped to assume a pre-determined form when relaxed, and is merely supported by the filling material. In either case, it is this minimum strain energy shape that is represented by the dashed line 194. If the rotating shaft 196, which in this case has an end cavity 197 of precisely the same radius of curvature as the foil surface 194, approaches the foil with enough force to further compress, or even expel and deflate, the pressurized air bearing film that exists between foil and shaft, and if the filling material 193 is incompressible, e.g., water, than the foil is just as stiff and solid as a bearing member as is the cup 192 itself (which may be e.g., of steel). Neither the water nor the foil will give way nor change shape at all, since the forces applied by the approaching shaft are everywhere substantially the same. For this reason, the foil pressurized with incompressible material, is capable of having all the advantages of stiffness and solidity that characterized an ordinary air bearing combination, without necessarily sacrificing the compliance to shaft movement that characterizes the type of foil bearing previously known in the art, e.g., the foil bearings 41 of FIGS. 1 and 3. Coupled with this stiffness capability, however, the foil bearing of the present invention has a tolerance for foreign matter similar to that which characterized the prior art foil bearing, and is lacking in the prior art solid journal bearing. This local sort of tolerance is illustrated in FIGS. 17, 18 with respect to a typical foreign body 199, e.g., which has somehow gotten into the pressurized air film zone between the shaft and foil. The body 199, driven by the mass of shaft 196, represents a local concentration of forces greater than those acting on the foil and filler 193 in surrounding areas. This unbalanced force concentration causes the foil to be locally depressed and the filler material at least locally displaced. Since the filler is incompressible, however, the total volume cannot change, causing a bulged zone 198 to appear nearby. Since the position of the foil at rest (line 194) represents the approximately smallest possible surface area that the foil is capable of assuming while containing the given volume of filler 193, it follows that the displaced and locally depressed or bulging position of the foil must represent a greater surface area and a tensioned further stretching of the foil. After the particle 199 has left the system, however, the foil elastically recovers its original minimal area and forces the material 193 back to its original shape.

It will also be seen that a concomittant and characterizing effect in the foil bearing of the present invention, which helps to distinguish it from the type of foils 41 of FIGS. 1 and 3, is that, given the direction of motion 201 of particle 199 (FIG. 18), the foil is constrained to stretchingly move in a number of directions, of which at least some (e.g., direction 202) have components (e.g., component 203) that are opposite in direction to the direction 201 of particle 199.

Thus there has been described a foil member stretched over a body of pressurizing material so as to be caused to balloon outwardly toward a rotating shaft. An air bearing is formed between the foil and shaft. The pressurizing material for the foil may be incompressible, but capable of plastic flow (e.g., water). Consequently, the foil is substantially stiff and unyielding to movement of the shaft toward the foil, but is locally yielding as to particles of foreign material that may get into the air film zone between foil and shaft, and elastically recovers its original shape when the particle is gone, having meanwhile suffered no damage.

It is claimed:

1. A bearing structure for cushioning the movement of an element, comprising:
   bearing means including a resiliently stretchable and imperforate foil member positioned with at least a portion of said means extending across the path of said element; and
   means for supplying a lubricant between said foil and said element for spacing said foil and element apart for a predetermined dimension;
   said bearing means also including means for pressurizing said foil on the side thereof opposite said element, so as to establish a normal operating pressure differential characterized by a higher pressure on the side of said foil opposite said element and a lower pressure on the side of said foil confronting said element, thereby resiliently stretching said foil bulgingly toward said element, and said foil being sufficiently thin that upon the localized introduction of any foreign body of dimension greater than said predetermined dimension between said element and said foil, said foil is displaced locally around said body in a plurality of different directions at least some of which have components opposite to the directions of motions of said body and said element.

2. A bearing structure as recited in claim 1, wherein said pressurizing means includes material that is plastically locally displaceable but substantially incompressible, said material being confined by said bearing means, and at least in part by said foil member thereof.

3. A bearing structure for use between first and second elements having relative motion, comprising:
   a foil member mounted on the first element so as to present at least one convexly curved and imperforate foil surface confronting the second element; and
   means for pressurizing said foil member on the concave side thereof opposite said convex surface, so as to establish a normal operating pressure differential characterized by a higher pressure on the concave side and a lower pressure on the convex side, and so as to cushion at least locally contacting impact of said second element thereagainst, and impact of foreign matter elements caught between said first and second elements, with said foil being sufficiently thin that portions thereof in the vicinity of impact are displaced in various directions at least some of which have components opposite to the direction of impact movement of the impacting element with respect to the first element.

4. A bearing structure as recited in claim 3, wherein said pressurizing means consists of a relatively incompressible but locally displaceable material, said foil being resiliently tensioned over said material so as to normally have a minimal area in contact with said material and so as to normally hold said material in a first convexly ballooning shape uniquely corresponding with and predetermined in relation with said minimal foil area; whereby said impacts of said second element or of said foreign matter elements on said foil cause local displacement of said material substantially without volume change thereof and consequent springy distortion of said foil to a greater surface area, followed by resilient recovery of said foil to said minimal area and return of said material to said uniquely corresponding ballooning shape.

5. A bearing structure as recited in claim 4, wherein said second element has a concave surface confronting said foil and formed to a substantially mating shape with respect to said first convexly ballooning shape of said material and said foil, whereby upon full impact of said first and second elements at all confronting points, said foil and said material change neither area nor volume and are relatively stiff and unyielding.

6. A bearing structure as recited in claim 3 wherein said second element is a rotating shaft and said first element is a thrust bearing member generally transverse to the axis of said shaft and confronting an axially transverse face thereof; and said foil member is mounted on said member confronting said shaft face and is peripherally secured to said member so as to define, with said member, an enclosed envelope for cushioning said rotating shaft against glancing impact having a component of axial thrust.

7. A bearing structure as recited in claim 6, wherein said shaft face is an end face of said shaft, said thrust bearing member having a face confronting said shaft end face, and said pressurizing means including material pressurized within said envelope so as to cause said foil surface to balloon convexly toward said shaft end face.

8. A bearing structure as recited in claim 7, wherein said face of said thrust bearing member is planar normal to the shaft and bearing axis.

9. A bearing structure as recited in claim 7, wherein said shaft end face is formed as a cavity confronting said convexly ballooning foil.

10. A bearing structure as recited in claim 9, wherein said cavity is conical in shape.

11. A bearing structure as recited in claim 9, wherein the concave surface of said cavity is formed to a substantially mating shape with respect to the convex surface of said ballooning foil face.

12. A bearing structure as recited in claim 6, wherein:
the midportion of said shaft is provided with a circumferential flange having opposite faces at least one of which defines said shaft face;
the thrust bearing member is a plate having a central opening circumvallating the shaft, said plate confronting said shaft face portion of said flange; and
said foil member is formed as a generally circular member having a central opening secured at the inner periphery thereof to the inner peripheral portion of said plate and at the outer periphery thereof to the outer peripheral portion of said plate.

13. A bearing structure as recited in claim 12 and also including:
a second thrust bearing plate similar to said first-mentioned plate and confronting the face of said flange that is opposite the flange face confronting said first-mentioned plate; and
a second foil member similar to said first-mentioned foil member and similarly mounted on said second plate to confront said flange.

14. A bearing structure as recited in claim 6 wherein said rotating shaft face is provided with spiral grooves for generating a self-acting pressurized fluid bearing film.

15. A bearing structure as recited in claim 14 wherein said grooves are of herringbone pattern.

16. A bearing structure as recited in claim 3, wherein:
said second element is a rotating shaft and said first element is a cylindrical hollow drum presenting a cavity confronting a face of said shaft; and
said foil member is stretched as a drum-head across the cavity of said drum confronting said shaft face.

17. A bearing structure as recited in claim 16, wherein said foil member comprises a plurality of individual foils in parallel superimposed relation so as to provide increased flexibility for the same foil member thickness.

18. A bearing structure as recited in claim 16, wherein a number of additional foil members are stretched across and within said cavity generally parallel to said first-mentioned foil member and are axially spaced from said first foil member and from one another so as to define a plurality of separately inflatable compartments in stacked array coaxial with and confronting said shaft face.

19. A bearing structure as recited in claim 18, wherein said pressurizing means is arranged for separately inflating said respective compartments so as to cause them to balloon progressively toward said shaft face.

20. A bearing structure as recited in claim 3, wherein:
said second element is a rotating shaft; and
said first element is a journal bearing member circumvallating said shaft;
said foil member being formed as an axially-complete half-toroid mounted between said shaft and journal and ballooning convexly toward said shaft.

21. A bearing structure as recited in claim 3 wherein said second element is a rotating shaft and said first element is a combination thrust-and-journal bearing member having portions both axially and circumferentially confronting corresponding portions of said shaft;
said foil member being mounted between said shaft and bearing member so as to balloon both axially and circumferentially toward said confronting corresponding portions of said shaft.

22. A bearing structure as recited in claim 3, wherein said pressurizing means includes a liquid.

23. A bearing structure as recited in claim 3, wherein said pressurizing means includes a gas.

24. A bearing structure as recited in claim 3 wherein said pressurizing means includes a relatively incompressible but locally displaceable material.

25. A bearing structure as recited in claim 24, wherein said material is water.

26. A bearing structure as recited in claim 24, wherein said material is solid particulate material.

27. A bearing structure as recited in claim 26, wherein said material is composed of substantially spherical particles.

28. A bearing structure as recited in claim 27, wherein said particles have a substantial distribution of varying sizes.

29. A bearing structure as recited in claim 3, and also including means for establishing a pressurized fluid bearing film between said foil member and said second element.

30. A bearing structure as recited in claim 29 wherein said means for establishing a fluid film includes means on said second element for generating a self-acting pressurized fluid bearing film.

* * * * *